United States Patent
Paquette et al.

[11] Patent Number: 5,909,542
[45] Date of Patent: Jun. 1, 1999

[54] DISTRIBUTED COMPUTING SYSTEM FOR EXECUTING INTERCOMMUNICATING APPLICATIONS PROGRAMS

[75] Inventors: Robin L. Paquette; Marek H. Kossak, both of Houston, Tex.

[73] Assignee: CFI Proservices, Inc., Portland, Oreg.

[21] Appl. No.: 08/752,878

[22] Filed: Nov. 20, 1996

[51] Int. Cl.[6] .............................. G06F 13/38; G06F 15/17
[52] U.S. Cl. ........................................................ 395/200.33
[58] Field of Search .......................... 395/200.33, 200.34, 395/200.35; 707/200

[56] References Cited

U.S. PATENT DOCUMENTS

| | | | |
|---|---|---|---|
| 4,325,120 | 4/1982 | Colley et al. ............................. | 711/202 |
| 5,329,619 | 7/1994 | Page et al. .......................... | 395/200.33 |
| 5,623,666 | 4/1997 | Pike et al. ................................ | 707/200 |
| 5,717,747 | 2/1998 | Boyle, III et al. ...................... | 379/201 |

*Primary Examiner*—Ellis B. Ramirez
*Assistant Examiner*—William Titcomb
*Attorney, Agent, or Firm*—Smith-Hill and Bedell

[57] ABSTRACT

A distributed computing system executes application programs which call functions, each function carrying out an operation such as read or write accessing a data file in response to an input argument generated by the calling application program. The system includes client computers for executing the application programs and server computers for executing "server programs", programs which carry out the called functions. The client and server computers communicate through a network. To make a function call, an application program running on a client computer generates an argument for the function and sends a request identifying the function to a "client gate" program also running on the client program. Each client computer stores a configuration file indicating which server star carries out each function, and which server computer can execute that server star. When the client gate receives the function request, it consults the configuration file and then sends a request referencing the identified server star and function to a "server gate" program executed by the identified server. The server gate thereupon invokes the server star which carries out the function. The server gate forwards function output data produced by the server star to the client gate which returns the data to the application program. Thus a change in the network location or structure of a data file used by application programs can be accommodated by modifying configuration files and/or the server stars without necessarily altering the application programs themselves.

19 Claims, 6 Drawing Sheets

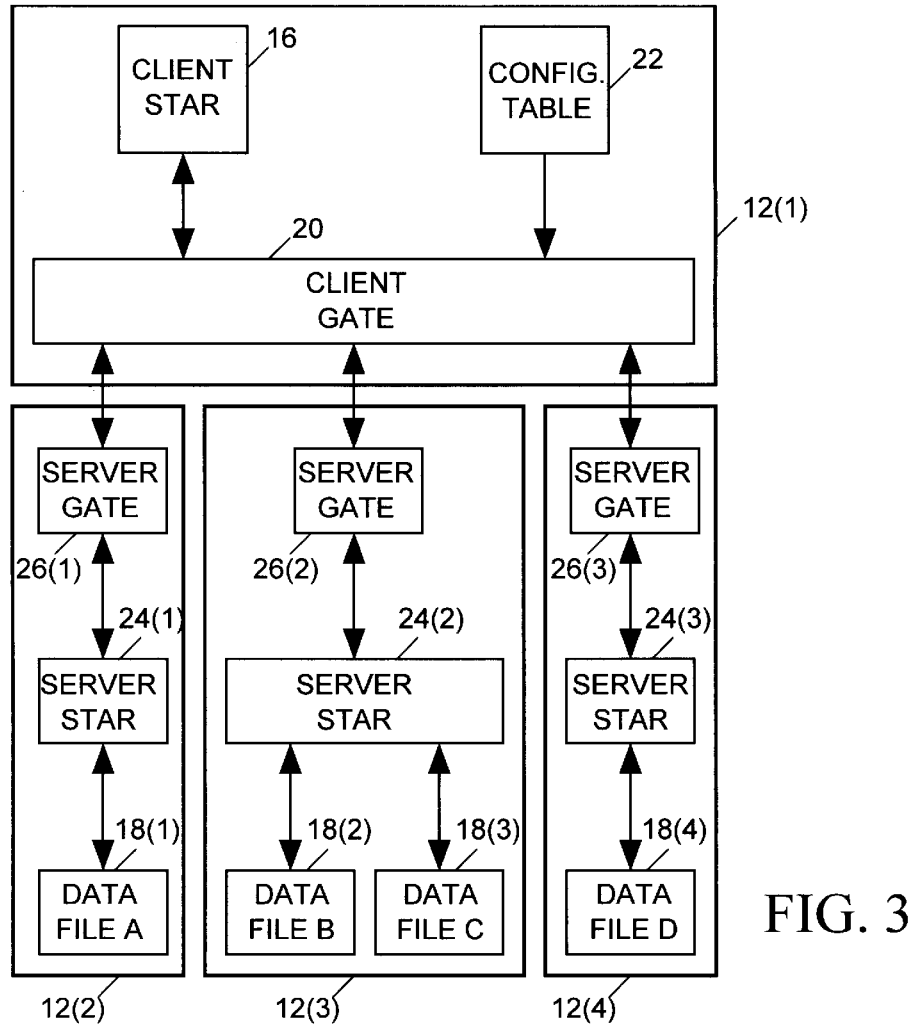
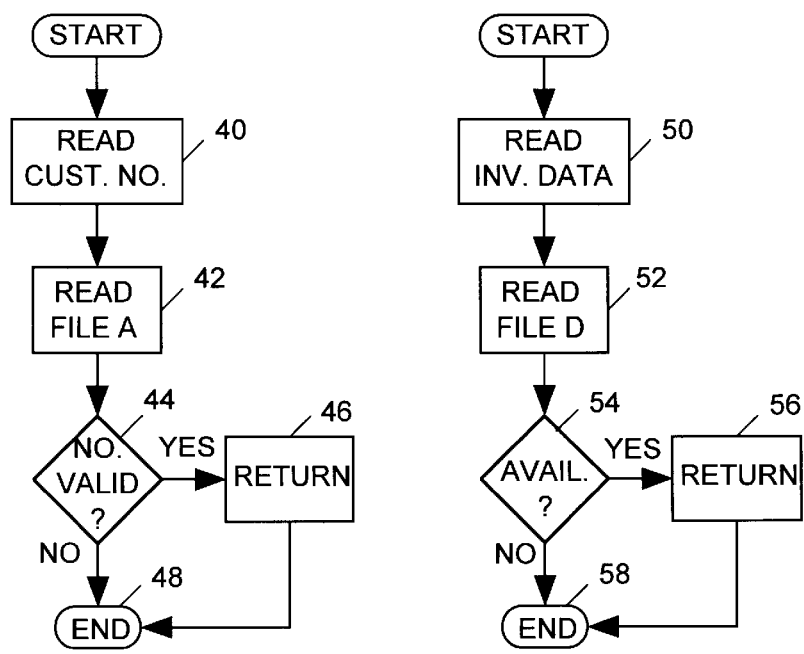
FIG. 3
FIG. 4
FIG. 5

DISTRIBUTED COMPUTING SYSTEM FOR EXECUTING INTERCOMMUNICATING APPLICATIONS PROGRAMS

BACKGROUND OF THE INVENTION

1. Field of the Invention

The present invention relates to a distributed computing system for executing application programs that communicate with one another.

2. Description of Related Art

In a distributed computing system where several computers are linked by a network, "server" computers store data files or operate peripheral devices such as printers which may be accessed by application programs running on "client" computers. In peer-to-peer networks each computer may act as either a server, a client or as both client and server. When an application program seeks to access a data file stored on a remote computer, an application program has to know how to locate and read or write to that file. Thus the application program must know, for example, which server computer stores the file and the name and directory of the file and the manner in which the data file is formatted. The application program may also have to know how to navigate the network to access that data file and how to communicate with the operating system employed by the server computer storing the data file.

The requirement for so much intelligence on the part of application programs seeking to access remote files makes it difficult for software designers to construct, modify and maintain the various major software components forming a distributed computing system. This is particularly true for an evolving peer-to-peer environment in which computer platforms, application programs and data files are frequently added or modified. While it would be beneficial to be able to assemble a software package for a custom distributed computing system from high level "off-the-shelf" application programs, the need to coordinate data transfer within the particular network environment in which they operate makes it difficult to do so without modifying the application programs. Also a change to any one application program, particularly in the manner in which it structures or locates a data file normally requires a programming change to all other application programs accessing that data file. Thus distributed data processing systems are often developed as custom packages for the specific network on which they are to be implemented, rather than assembled form "off-the-shelf" application programs, and subsequent changes to such systems must be carefully coordinated with the system developer.

What is needed is a system allowing application programs executed by various computer platforms interconnected through a network to access data files and to communicate with one another in a standardized fashion regardless of the nature of the network, regardless the nature of the various platforms, and regardless of where each application program or data file is located.

SUMMARY OF THE INVENTION

In accordance with the present invention, a distributed computing system includes a network of computers, each of which may act as a client, a server or both. A server computer stores data files accessed by an application program ("client star") running on a client computer. To access a data file stored on a server a client star generates a request data block and then passes a request to a "client gate" program also running on the client computer. The request includes a function ID identifying a data file read/write access function to be carried out by a "server star" executed by the server. The request data block contains "argument" data used by the server star when read or write accessing the data file. For example, for a data write function, the argument may include data to be written to the data file. For a data read function, the argument may identify the data to be read from the data file.

The client gate, upon receiving the request from the client star, consults a "configuration table" stored on the client computer. For each function ID conveyed in the request, the configuration table indicates which server contains the data file to be accessed and identifies a particular server star that can carry out the identified function. After consulting the configuration table, the client gate generates a "request control block" containing a reference to the server star and containing a pointer to the argument in the request data block. The client gate then passes the request data block to the server computer and passes the request control block to a "server gate" running on the identified server. The server gate responds to the request control block by invoking the identified server star and passing the function ID and the data argument pointer to the server star.

The server star thereupon carries out the function referenced by the function ID. Depending on the function requested, the server star may, for example, write the data in the argument to a data file, read data identified by the argument from the data file, or both. If data is to be returned to the client star, the server star stores that data in a "response data block" and then returns a pointer to the response data block to the server gate. Upon receiving the pointer from the server star, the server gate passes the response data block and a "response control" block including the pointer to the response data block to the client gate via the network. The client gate, upon receiving the response control block, returns the pointer to the response data block to the client star. The client star thereupon obtains the returned data from the response data block referenced by the pointer.

Thus while client stars may read or write access remote files, they do not need to know where those files are located or necessarily how those files are formatted. Nor do client stars need to concern themselves with particulars of the network environment. Such matters are handled by the client and server gates, the server stars and the configuration file. When the location or structure of a data file changes, it is necessary only to change the configuration files and the server stars to accommodate such data file changes. It is not necessary to change the client application programs which use the data file. The present invention therefore simplifies the task of creating and modifying a distributed computing system made up of high level application programs since the structure and location of data files are transparent to programs that access them.

It is accordingly an object of the present invention to provided a system which standardizes the way in which application programs communicate in a network environment so as to render the nature of the network environment transparent to the application programs.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIGS. 2 and 3 are block diagrams illustrating examples of operation of the distributed computing system of FIG. 1;

FIG. 4–9 are flow charts illustrating operations of server stars of FIG. 3;

DESCRIPTION OF THE PREFERRED EMBODIMENT(S) SYSTEM ARCHITECTURE

Figure 1:
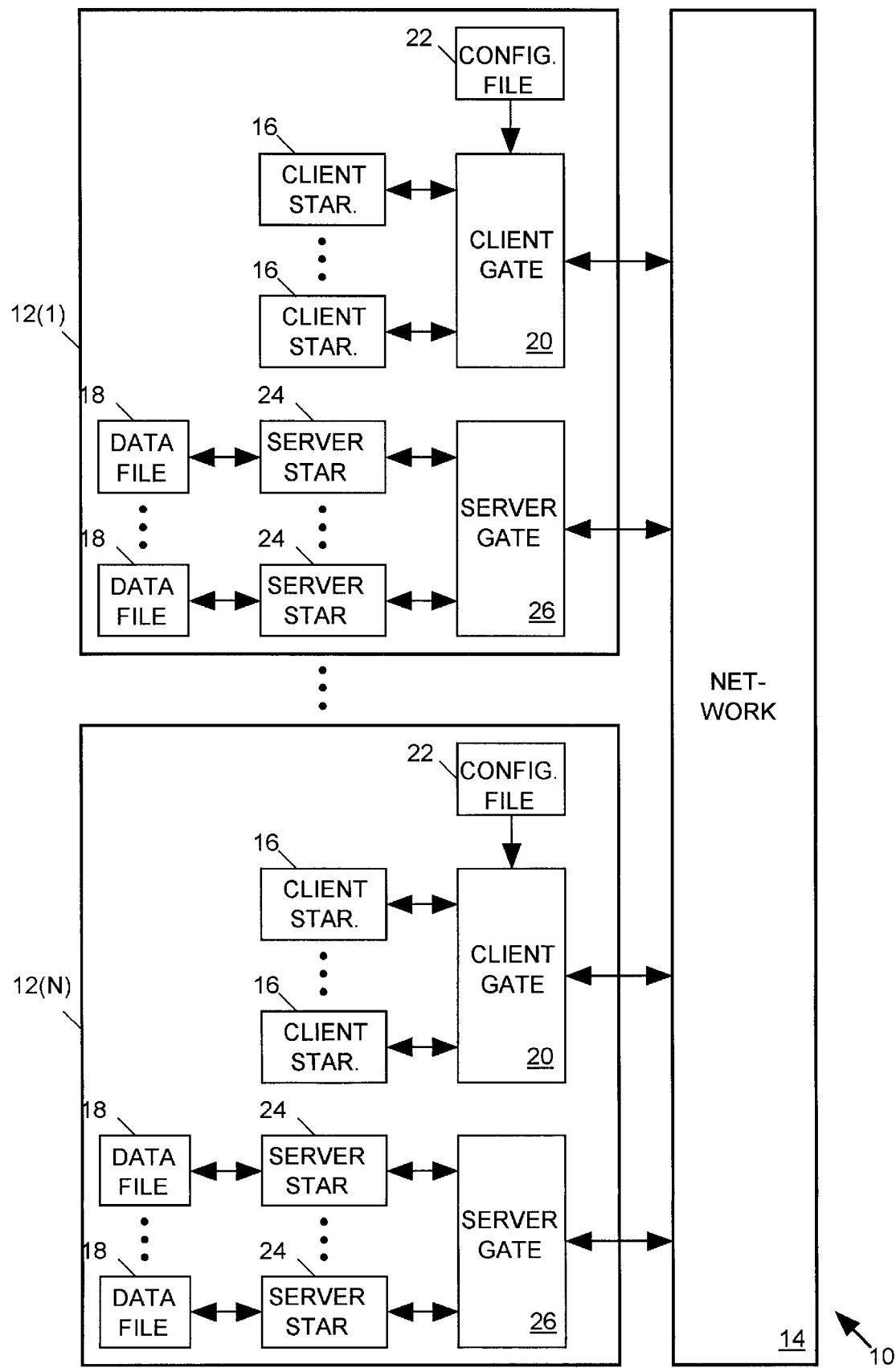
FIG. 1 is a block diagram of a distributed computing system in accordance with the present invention.

FIG. 1 is a block diagram of a distributed computing system 10 in accordance with the present invention. System 10 includes a set of N computers 12(1)–12(N) interconnected through a network 14. Each computer 12 may be any commonly available computer capable of storing and executing software, including a mainframe or a personal computer. Network 14 may be any commonly available network system such as an Ethernet system suitable for linking computers 12 so that they can communicate with one another. Each computer 12 may act as a "client" computer for executing one or more application programs ("client stars" 16) and/or may act as a "server" computer storing one or more data files 18 used by the client stars 16. Each client computer 12 runs a "client gate" program 20 serving as an interface for any local client star 16 seeking to read or write access a remote data file 18. Each server computer 12 executes one or more "server stars" 24, application programs designed to carry out one or more data access functions on local data files 18. Each server computer 12 also runs a "server gate" program 26 providing an interface between its local server stars 24 and remote client gates 20.

When an client star 16 seeks to access a data file 18, it sends a request for a particular data file access function to its local client gate 20. The request identifies the data access function by a unique function identification (ID) code. The client gate 20 then consults a local "configuration file" 22 which lists for each function ID the name and location of the server star 24 that is to carry out the requested data file access function. The client gate 20 then sends a request to the appropriate server gate 26 telling the server gate to invoke the appropriate server star 24. When called, the server star 24 carries out the requested function, for example, by read and/or write accessing a particular data file 18. The server star 24 returns any output (such as data read out of a file 18) to its calling server gate 26. The server gate 26 forwards that output to the requesting client star 16 via its client gate 20.

Since client stars 16 only indirectly read or write access data files 18, they do not need to know where those files are located, how they are named, or necessarily how those files are formatted. Client stars 16 therefore do not need to concern themselves with particulars of the network environment or the platform on which the data files reside. Such matters are handled by the client and server gates 20 and 26, configuration files 22, and the server stars 24. Therefore, when the location, name, and/or structure of a data file changes, it is necessary to change only the server stars 24 which access them and/or the configuration files 22 referencing them. It is normally not necessary to alter the client stars 16 that use the files. The present invention therefore simplifies the task of creating or adapting client applications for use in a distributed computing system and reduces or eliminates the need to change application programs to accommodate changes in the location or structure of the data files they use.

System Operation—Single Function Request

Figure 2:
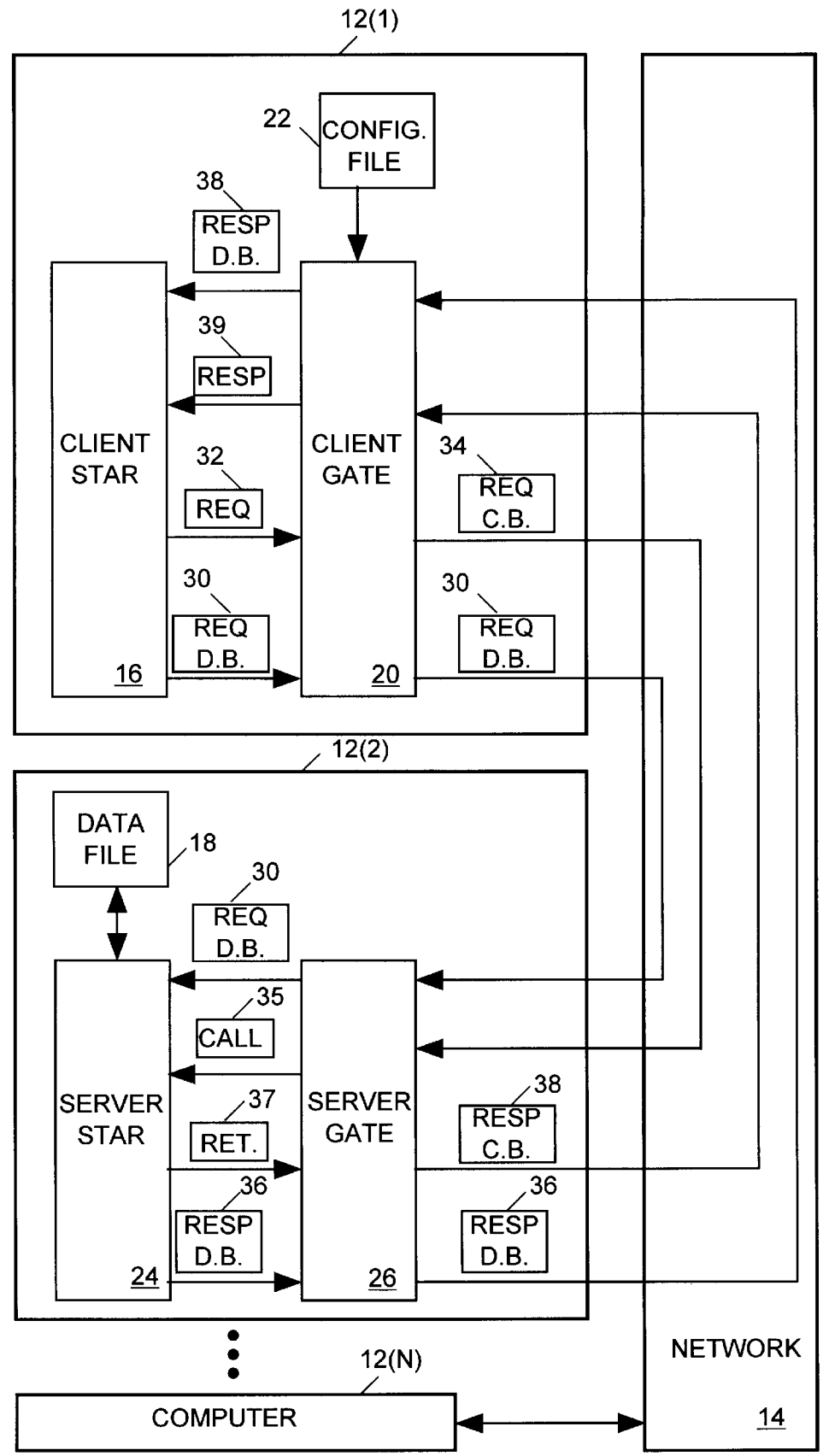

FIG. 2 illustrates a simple example of system operation wherein computer 12(1) runs a client star 16 seeking to read or write access a single data file 18 stored on computer 12(2). To initiate a read or write access function, client star 16 generates and stores on client computer 12(1) a request data block 30, a file containing a data "argument" relating to the read or write access function. For example, when client star 16 seeks to write data to some part of file 18, the argument contained in request data block 30 includes the data to be written to data file 18 along with some reference to the part of data file 18 to receive the data. When client star 16 seeks to read a portion of data file 18, the argument contained in request data block 30 may include a reference to the portion of the data file to be read.

After generating the request data block 30, client star 16 invokes the local client gate 20 and passes a request (REQ) 32 to the client gate. Request 32 is a data structure that includes pointers to the function argument in request data block 30 along with the ID of the particular data file read/write access function to be carried out.

The client gate 20, upon receiving request 32 from client star 16, consults a configuration table 22 stored on the client computer 12(1). For each function ID, configuration table 22 stores references to particular server star to carry out the function and to the server that is to execute the server. After consulting the configuration table 22, the client gate 20 passes the request data block 30 to the identified server 12(2) and generates a request control block 34, a data structure referencing server star 24 and containing a pointer to the function argument in request data block 30 sent to server 12(2). The client gate 20 then sends the request control block 34 through network 14 to the server gate 26 running on the server 12(2).

Server gate 26 responds to the request control block 32 by calling the server star 24 identified in the request control block and by passing the function ID and the data argument pointers to server star 24 via a "call" data structure 35. Server star 24 thereupon carries out the function indicated by the function ID received from server gate 26. When function output data (such as data read out of data file 18) is to be returned to client star 16, server star 24 places that data in another data structure (response data block 36) and then returns a pointer to response data block 36 to server gate 26 via a "return" data structure 37.

Upon receiving return 37 from server star 24, server gate 26 forwards the response data block 36 to the client computer 12(1) via network 14. Server gate 26 also generates and sends a response control block 38 to client gate 20. Response control block 38 includes a pointer to the function output data in response data block 38 now stored on client computer 12(1). The client gate 20, upon receiving the response control block 38, returns a response 39 to client star 16 containing pointers to the function argument in the response data block 38. Application program 16 thereupon obtains the returned function output data from the response data block 38 referenced in response 39.

As illustrated in the example above, to read or write access a file 18 on any server connected to network 14, the client star 16 simply writes an argument to a local request data block 30 and sends a request 32 to the local client gate 20, the request including a function ID and a pointers to the arguments in the request data block 30. When the client star 16 thereafter receives a response 38 from client gate 20, client star 16 reads returned data out of a locally stored response data block 38 referenced by the response 39. Note that it is not necessary that client star 16 know where in the network file 18 is located or even necessarily how that file is structured. Nor is it necessary that the client star 16 be aware that it is even operating in a network environment.

The present invention simplifies the task of creating and using application programs for a distributed computing system since the nature and structure of the system network, data file location, and the manner in which data files are accessed, are irrelevant to the application programs. In particular, changes to the location or nature of a data file do not necessarily require changes to the application programs which access them. For example, the location of data file 18 could be changed from computer 12(2) to computer 12(N) without making any changes to client star 16. The change in data file 18 location may be accommodated simply by changing all relevant entries in configuration file 22 and by relocating server star 24 to computer 12(N). Similarly, a change to the structure of data file 18 could be accommodated by modifying server star 24 without necessarily requiring any change to the client application, data star 16.

Data Structures

The following Tables I through VII illustrate the various data structures employed by the present invention.

REQUEST

Table I below illustrates the structure of the request 32 sent from the client star 16 to client gate 20 of FIG. 2.

TABLE I

| | |
|---|---|
| ReqCnt | Number of functions requested |
| Entry: | (One entry per function requested) |
| FunctID | Function ID |
| Offset | Position of data argument in Request Data Block |
| Length | Length of data argument in Request Data Block |

A client star 16 can invoke one or more one functions with a single request. The first field (ReqCnt) of request 32 indicates the number of functions to be invoked. The request includes a separate entry for each function requested, each entry containing a FunctID field, an Offset field and a Length field. The FunctID field identifies the function being requested. Client gate 20 uses FunctID as a key into configuration file 22 which, as discussed below, tells client gate 20 which server star 24 is to carry out the requested data access function and indicates how the client gate is to process the request. The request data block 30 may include a separate argument for each function requested. The Offset field in each entry of request 32 is a pointer to a function's argument within request data block 30. The Length field indicates the length of the function's argument.

CONFIGURATION FILE

Configuration file 22 includes a header and a separate entry for every function. Table II below illustrates the structure of configuration file 22.

TABLE II

| | |
|---|---|
| Sync | Synchronous Flag |
| TimeOut | Time server gate waits for server star response |
| Entry | (One entry per function) |
| FunctID | Function ID (entry key) |
| Server | Identifies the server |
| Seq | Sequential flag |
| DataStar | Identifies server star program to be invoked |
| Backout | Backout flag |

A Sync flag in the header indicates whether the client gate is to synchronously or asynchronously respond to a request. When a client gate responds synchronously, it forwards a comprehensive response to the client star only after it has received responses from all server gates that have been sent requests. When a client gate responds asynchronously, it forwards responses to the client star one-by-one as they are received from the client gates.

A TimeOut header field indicates how long a server gate is to wait for a response from the server star. If for any reason a server star fails to execute its function and respond to the server gate within the allotted time, the server gate that called the server star returns a response control block to the client gate indicating that the requested function was unsuccessful. The client gate then sends a response to the requesting client star indicating that the requested function was not executed.

The configuration file includes a separate entry for each function.

Each configuration file 22 entry includes a FunctID field identifying the function associated with the entry. Client gate 20 uses this field as a key for accessing the data in file 22 when it processes request 32 from client star 16. A Server field indicates which of computers 12(1)–12(N) is to execute the server star that is to carry out the function. A DataStar field identifies the particular server star 24 that is to carry out the requested function. A Seq field contains a flag indicating whether the server gate is to respond "sequentially" or "non-sequentially" as discussed herein below. A Backout field contains a backout flag passed to the server gate. The backout flag tells the server gate whether a server star completing its function after the Timeout time has passed is to execute a "backout" function. As discussed in detail below, a server star typically executes a backout function to undo any changes it may have made to a data file after the allotted timeout period.

REQUEST CONTROL BLOCK

Table III below illustrates the structure of the request control block 22 client gate 20 passes to the server gate 26 in response to a request from the client star 16.

TABLE III

| | |
|---|---|
| ReqCnt | Number of functions requested |
| Timeout | Time allotted for response |
| Entry | (One entry per function) |
| FunctID | Function ID |
| DataStar | Server star to invoke |
| Offset | Argument position |
| Length | Argument length |
| Seq | Sequential flag |
| Backout | Backout flag |

A client gate sends separate request control blocks to each server gate that is to invoke a server star. Each request control block has a header and one or more entries, each entry defining a separate function to be carried out by a server star to be invoked by the server gate. As shown in Table III, the first header field of a request control block is a request count (ReqCnt) indicating the number of entries to follow. (One entry is shown in Table III.) The Timeout value is contained in a second header field. Each entry includes a FunctID field conveying the ID of the function to be carried out and a DataStar field referencing the server star to carry out the function. Each entry also includes an Offset field pointing to the argument for the function in the request data block and a Length field indicating the size of the argument. Each entry further includes the previously mentioned Seq and Backout fields.

DATA STAR CALL

When the server gate calls (invokes) a server star 24 it passes to the server star the call data structure 35 shown below in Table IV.

TABLE IV

| | |
|---|---|
| ReqCnt | Number of functions to be carried out by server star |
| Entry | (One entry per function to be carried out) |
| FunctID | Function ID |
| Offset | Position of argument data in request data block |
| Length | Length of argument data in request data block |

A server star 24 can carry out more than one function. The ReqCnt header field indicates the number of functions that the server star 24 is requested to carry out. Call structure 35 contains one entry for each such function to be executed. (One such entry is shown in Table IV.) Each entry includes a FunctID field identifying a function to be executed and Offset and Length fields indicating the position and length of the argument for that function within the request data block 30.

DATA STAR RESPONSE

Table V below lists the information a server star 24 returns to server gate 26 in return data structure 37 after server star 24 has carried out its requested functions.

TABLE V

| | |
|---|---|
| ReqCnt | Number of functions |
| Entry | (One entry per requested function) |
| FunctID | Function ID |
| Offset | Position of data in response data block |
| Length | Length of data in response data block |

The ReqCnt header field indicates the number of requested functions for which the server star 24 is responding. The return structure 37 includes one entry per function. (One such entry is shown in Table V.) The FunctID field in each entry identifies the requested function ID. The Offset and Length fields indicate the position and length of the function output data within the response data block 36 generated by server star 24.

RESPONSE CONTROL BLOCK

Table VI lists the fields of the response control block data structure 38 returned from server gate 26 to a client gate 20.

TABLE VI

| | |
|---|---|
| ReqCnt | Number of function responses included |
| Entry | (One entry per function response) |
| FunctID | Function ID |
| Status | Response status code |
| Offset | Position of data in Response Data Block |
| Length | Length of data in Response Data Block |

A ReqCnt header field indicates the number of functions included in the response control block. The response control block 38 includes one entry for each function. (One such entry is shown in Table VI.) Each entry includes a FunctID field referencing the function, a Status field indicating whether the function was successfully executed, and Offset and Length fields referencing the position and length of function output data returned in the response data block 36.

RESPONSE

Table VII lists the data structure the client gate 20 returns in its response 39 to the client star 16.

TABLE VII

| | |
|---|---|
| ReqCnt | Number of function responses included |
| Entry | (One entry per function response) |
| FunctID | Function ID |
| Status | Response status code |
| Offset | Position of data in Response Data Block |
| Length | Length of data in Response Data Block |

The ReqCnt header field indicates the number entries included in response 39. One entry is provided in the data structure for each function response. (Only one such entry is shown in Table VII.) Each entry includes a FunctID field referencing the function requested, a Status field indicating whether the function was successfully executed, and Offset and Length fields referencing the position and length of function output data returned in the response data block 38.

System Operation —Multiple Function Request

FIG. 3 illustrates an example application of the present invention in which client star 16, running on computer 12(1) at a retail store, allows a sales person to enter data regarding a credit sale of a quantity of goods to a customer with an account at the store. Computer 12(2) in the store's marketing department maintains a list of customer account numbers in data file 18(1) (file A). Computer 12(3) in the accounting department keeps track of the balance due on each customer's account in data file 18(2) (file B) and makes entries into a general accounting ledger, data file 18(3) (file C). Computer 12(4), at the store's warehouse, keeps track of inventory data in data file 18(4) (file D).

After the sales person enters data regarding the credit sale into application 16, application 16 checks data file A to determine if the customer account number is valid. If the customer account number is valid, client star 16 checks the inventory (file D) to determine if the item to be purchased is available in the warehouse. If a sufficient quantity of goods is available, the client star 16 checks the customer's credit limit (file B). If the credit limit is sufficient to cover the purchase amount, the client star posts the credit sale transaction in the general ledger (file C), and adjusts the inventory level (file D) to reflect the sale. The present invention allows client star 16 to carry out all phases of the transaction by sending a single request to its local client gate 20 rather than by directly accessing the four remote data files A–D.

Tables VIII through XXVII illustrate the various data structures passed between the client star 16, client gate 20, server gates 26 and server stars 24. For simplicity these data structures are not shown in FIG. 3.

REQUEST DATA BLOCK

Table VIII below illustrates a request data block produced by client star 16 containing arguments for the various functions program 16 requests.

TABLE VIII

| Bits | Content |
| --- | --- |
| 1–20 | Customer account number |
| 21–149 | Purchase price |
| 150–249 | Stock number |
| 250–349 | Quantity |

Bits 1–20 of the request data block contain the customer account number. Bits 21–149 contain the purchase price, bits 150–249 contain the stock number of the items to be purchased, and bits 250–359 indicate the quantity of items to be purchased.

REQUEST

Table IX below illustrates the structure of the request client star 16 sends to client gate 20.

TABLE IX

| | |
| --- | --- |
| ReqCnt | 5 |
| FunctID | 122 (Account Number check) |
| Offset | 0 |
| Length | 20 |
| FunctID | 129 (Inventory check) |
| Offset | 149 |
| Length | 200 |
| FunctID | 378 (Credit limit check) |
| Offset | 0 |
| Length | 149 |
| FunctID | 34 (General ledger entry) |
| Offset | 0 |
| Length | 149 |
| FunctID | 130 (Inventory adjustment) |
| Offset | 149 |
| Length | 200 |

The ReqCnt value is 5 indicating that application 16 is requesting five functions. The first function (FunctID=122) checks data file A to determine the validity of the customer's account number. Accordingly, the customer's account number, the first 20 bits of the request data block (Table VIII), is the argument of the first function. Thus the first function has offset and length of 0 and 20, respectively. The second function (FunctID=129) checks the inventory level in data file D and uses bits 150–349 of the request data block (stock number and quantity) as its argument. Thus the offset and length are 149 and 200, respectively. The third function (FunctID=378) checks the customer's credit limit in data file B using bits 1–149 of the request data block (customer account number and purchase price) as its argument. Thus the offset for the third function argument is 0 and its length is 149. The fourth function (FunctID=34) carries out the general ledger entry in data file C and uses bits 1–149 of the request data block (customer account number and purchase price) as its argument. Thus the offset and length are 0 and 149, respectively. The fifth function (Functll)=130) adjusts inventory in data file D and uses bits 1–149 of the request data block (customer account number and purchase price) as its argument. Thus the fifth function argument offset, is 149 and length is 200.

CONFIGURATION FILE

After receiving the request of Table IX, client gate 20 consults configuration file 22. Table X below lists the configuration table 22 entries for the five requested functions.

TABLE X

| | |
| --- | --- |
| Sync | True |
| Timeout | 10 seconds |
| FunctID | 122 (ID check) |
| Server | 26(1) |
| Seq | False |
| DataStar | 24(1) |
| Backout | False |
| FunctID | 129 (Inventory check) |
| Server | 26(3) |
| Seq | False |
| DataStar | 24(3) |
| Backout | False |
| FunctID | 378 (Credit limit check) |
| Server | 26(2) |
| Seq | False |
| DataStar | 24(2) |
| Backout | False |
| FunctID | 34 (General ledger entry) |
| Server | 26(2) |
| Seq | True |
| DataStar | 24(2) |
| Backout | True |
| FunctID | 130 (Inventory adjustment) |
| Server | 26(3) |
| Seq | True |
| Datastar | 24(3) |
| Backout | True |

The Sync header field, being set True, indicates that client gate 20 is to send a single response to client star 16 after all invoked server gates 26 have sent their responses to client gate 20. Had the Sync field been set false, client gate 20 would have forwarded each response to the client application 16 asynchronously when the client gate 20 received the response from a server gate 26. The TimeOut header field value of 10 seconds indicates that if a server star 24 is unable to carry out its function within 10 seconds, then the requesting server gate 26 is to return a response control block to client gate 20 with a Status flag indicating that the server star has failed to carry out the requested function.

For function number 122, server gate 26(1) is to invoke server star 24(1). The False flag in the Backout field of the configuration file entry indicates that even if server star 24(1) should succeed in accessing data file A only after the 10 second time limit, no "backout" operation is required. A backout operation "undoes" a previous file write operation and is normally required only when a server star writes data to a file after the expiration of the TimeOut limit, since by that time a client star requesting the file write operation will have already been notified that the file write operation has failed. If the Backout flag is true, then a server gate having invoked a server star responding after the TimeOut limit, will again call the server star and command it to perform its backout function. However, in the instant case, should server star 24(1) respond after the TimeOut limit, no backout operation is required since server star 24(1) does not alter data file A.

The false flag in the Seq field indicates that the next function of the request (the inventory check function 129) should not be carried out until the customer account number check has been successfully completed. In this example server star 24(1) compares the customer account number to the list of valid IDs in data file A. If the customer account number is valid, server star 24(1) responds to server gate 26 with an indication that the data file access was successful. Server gate 26 then forwards the response to client gate 20. At that point, client: gate 20 sends a request control block to server gate 26(3) telling it to invoke server star 24(3) which carries out the next requested function.

However, if the customer account number is not valid, server star 24(1) terminates without sending a response to server gate 26(1). Therefore, 10 seconds after invoking server star 24(1), server gate 26(1) sends a response to control block to client gate 20 with a Status flag set to indicate that the data file A access failed. Client gate 20 then sends a similar response to client star 16 and does not process any of the remaining four function requests. The client star 16 may then display an indication that the client account number could not be confirmed. Thus the Seq field in a configuration table 22 entry for a function listed in a request, when set false, indicates that execution of any subsequently listed function in the request is contingent upon successful completion of that function. However when the Seq field for a function is set true, subsequently listed functions may be carried out concurrently with that function since they are not dependent on successful completion of the preceding function.

As may be determined from Table IX, after successful completion of the customer account number check function, server 26(3) invokes server star 24(3) which carries out the inventory check function (FunctID=129). No backout function is required. Server star 24(3) responds to server gate 26(3) only if it finds sufficient quantity of goods to fill the order. The Seq field is set false to prevent the system from executing the remaining requested functions unless server star 24(3) responds to server gate 26(3).

If the inventory check function was successful, client gate 20 tells server 26(2) to invoke server star 24(2) which carries out the credit check function (FunctID=378). No backout function is required. Server star 24(2) responds to server gate 26(2) only if it finds the customer's credit limit is sufficient to cover the purchase price. Again the Seq field for function 378 is set false to prevent the system from completing the transaction unless server star 24(2) finds a satisfactory credit limit.

The configuration table 22 entry for the general ledger entry function (FunctID=34) seen in Table IX indicates that server 26(2) is to invoke server star 24(2). Since the function writes data to data file C, the Backout flag is set true so that server star 24(2) will be instructed to undo any write operation occurring after the allotted 10 seconds. The Seq field is set true so that the next function in the request (inventory adjustment) can be carried out concurrently with the general ledger entry function.

As seen in Table X, the inventory adjustment function (FunctID=130) is to be carried out by server star 24(3) invoked by server 26(3). A backout operation is to be performed if the operation occurs after the allotted 10 second time limit.

REQUEST CONTROL BLOCKS

Table XI below illustrates the request control block client gate 20 sends to server gate 26(1).

TABLE XI

| TimeOut | 10 seconds |
|---|---|
| ReqCnt | 1 |
| FunctID | 122 |
| DataStar | 24(1) |
| Offset | 0 |
| Length | 20 |
| Seq | False |
| Backout | False |

The ReqCnt field is set to 1 to indicate that server gate 26(1) is to handle only one request. Client gate 20 obtains values for the DataStar, Seq, TimeOut and Backout fields from the configuration table 22 entry for function ID 122 (Table X). Client gate 20 obtains values for the Offset and Length fields from the request data structure provided by the application (Table IX).

Table XII below illustrates the request control block client gate 20 sends to server gate 26(2).

TABLE XII

| TimeOut | 10 seconds |
|---|---|
| ReqCnt | 2 |
| FunctID | 378 |
| DataStar | 24(2) |
| Offset | 0 |
| Length | 149 |
| Seq | False |
| Backout | False |
| FunctID | 34 |
| DataStar | 24(2) |
| Offset | 0 |
| Length | 149 |
| Seq | True |
| Backout | True |

The ReqCnt field is set to 2 to indicate that server gate 26(2) is to handle two functions. Data Star 24(2) carries out both functions. Since the Seq field for function 378 is set False, server gate 26(2) invokes function 34 only if server star 24(2) successfully completes function 378 within 10 seconds.

Table XIII below illustrates a first request control block client gate 20 sends to server gate 26(3) to initiate the inventory check function.

TABLE XIII

| TimeOut | 10 seconds |
|---|---|
| ReqCnt | 1 |
| FunctID | 129 |
| DataStar | 24(3) |
| Offset | 0 |
| Length | 149 |
| Seq | False |
| Backout | False |

After server star 24(3) carries out the inventory check, finds available inventory to cover the order and reports back to client gate 20 via server gate 26(3), and after server star 24(2) has reported to client gate 20 via server gate 26(2) that the customer's credit limit is satisfactory, client gate sends a second request control block to server gate 23(3) to initiate the inventory adjustment function.

Table XIV below illustrates the second request control sent to server gate 26(3).

TABLE XIV

| TimeOut | 10 seconds |
|---|---|
| ReqCnt | 1 |
| FunctID | 130 |
| DataStar | 24(3) |
| Offset | 149 |
| Length | 200 |
| Seq | True |
| Backout | True |

Note that client gate 20 sent two request control blocks to server gate 26(3), each requesting one function. It could not send a single request control block to server gate 26(3) requesting two functions, since the second function, inventory adjustment, was dependent on successful completion of the credit limit check function carried out by server star 24(2). The credit check occurs between the inventory check and the inventory adjustment. Since the Seq field for the credit check function was set False, the client gate 20 has to wait until the credit check function succeeded before telling server gate 26(3) to initiate the inventory adjustment.

CALL AND RETURN DATA STRUCTURES

Table XV illustrates the call data structure server gate 26(1) passes to server star 24(1) when it invokes the server star.

TABLE XV

| | |
|---|---|
| ReqCnt | 1 |
| FunctID | 122 |
| Offset | 0 |
| Length | 20 |

The ReqCnt field indicates that server star 24(1) is to carry out one function, the customer account number check (FunctID 122), and that it is to find a 20 bit argument for the function (the customer account number) at offset 0 in the request data block.

Table XVI below illustrates the return data structure server star 24(1) sends to server gate 26(1) at step 46.

TABLE XVI

| | |
|---|---|
| ReqCnt | 1 |
| FunctID | 122 |
| Offset | 0 |
| Length | 0 |

The ReqCnt field indicates that server star 24(1) is responding to function 122. The Offset and Length fields normally key into a response data block produced by the server star. In this case, since the response data block contains no data, the Offset and Length fields are each set to 0.

Table XVII below illustrates the call data structure server gate 26(3) passes to server star 24(3) when it first invokes the server star.

TABLE XVII

| | |
|---|---|
| ReqCnt | 1 |
| FunctID | 129 |
| Offset | 0 |
| Length | 149 |

The ReqCnt field indicates that server star 24(3) is to carry out one function, the inventory check (FunctID 129), and that it is to find the 149 bit argument at offset 0 in the request data block.

Table XVIII below illustrates the return data structure server star 24(3) sends to server gate 26(3) when the inventory has a sufficient quantity of goods on hand.

TABLE XVIII

| | |
|---|---|
| ReqCnt | 1 |
| FunctID | 129 |
| Offset | 0 |
| Length | 175 |

The ReqCnt field indicates that the server star has carried out one function and the FunctID field identifies that function as the inventory check 129. The Offset and Length fields key into a response data block produced by the server star which contains 175 bits of data showing the amount currently available in inventory.

Table XIX below illustrates the call data structure server gate 26(2) passes to server star 24(2).

TABLE XIX

| | |
|---|---|
| ReqCnt | 2 |
| FunctID | 378 |
| Offset | 0 |
| Length | 149 |
| FunctID | 34 |
| Offset | 0 |
| Length | 149 |

The ReqCnt field indicates that server star 24(2) is to carry out two functions, the credit check (FunctID=378), and the general ledger entry (FunctID=34). The Offset and Length fields indicate that both functions make use of 149 bits of data in the request data block starting at offset 0.

Table XX below illustrates the return data structure server star 24(2) returns to server gate 26(2).

TABLE XX

| | |
|---|---|
| ReqCnt | 2 |
| FunctID | 378 |
| Offset | 0 |
| Length | 175 |
| FunctID | 34 |
| Offset | 175 |
| Length | 0 |

The ReqCnt field indicates that server star 24(2) is responding to two functions. The first FunctID field identifies, the credit check function 378. The first Offset and Length fields key the first 175 bits of the response data block produced by the server star showing the customer's current credit limit. The second FunctID field identifies the general ledger entry function 34. The second Offset and Length fields also key into the response data block produced by the server star. However, since the general ledger entry function does not return any data, the Length is set to 0.

Table XXI illustrates the call data structure server gate 26(3) passes to server star 24(3) at step 94.

TABLE XXI

| | |
|---|---|
| ReqCnt | 1 |
| FunctID | 130 |
| Offset | 149 |
| Length | 200 |

The ReqCnt field indicates that server star 24(3) is to carry out one function, the inventory adjustment (FunctID=130), and that it is to find the 200 bit argument containing the current inventory level at offset 149 in the request data block.

RESPONSE CONTROL BLOCKS

Table XXII below illustrates the response control block server gate 26(1) sends to client gate 20 when server star 24(1) returns having found that the customer account number is valid.

TABLE XXII

| | |
|---|---|
| ReqCnt | 1 |
| FunctID | 122 |
| Status | True |
| Offset | 0 |
| Length | 0 |

The ReqCnt field indicates the response control block refers to one requested function. The FunctID field identifies the function number 122. The Status field contains a flag set true to indicate that the function was successfully carried out. (If server star 24(1) had not responded to server gate 26(1) within the allotted time, server gate 26(1) would have set the Status flag to false to indicate the function failed.) The Offset and Length fields key into a response data block server gate 26(1) sends to the client gate. In this case, since the response data block contains no function output data, the Offset and Length fields are set to 0.

Table XXIII below illustrates the response control block server gate 26(3) sends to client gate 20 when server star 24(3) returns after completing the inventory check function.

TABLE XXIII

| ReqCnt | 1 |
|---|---|
| FunctID | 129 |
| Status | True |
| Offset | 0 |
| Length | 175 |

The ReqCnt field indicates the response control block refers to one requested function. The FunctID field identifies the function as the inventory check function 129. The Status field contains a flag set true to indicate that the function was successfully carried out. (If server star 24(3) did not respond to server gate 26(3) within the allotted time, server gate 26(3) would have set the Status flag to false to indicate the function failed.) The Offset and Length fields key into the response data block produced by server star 24(3) conveying the 175 bit current inventory level data.

Table XXIV below illustrates the response control block server gate 26(2) sends to client gate 20 when server star 24(2) has completed its credit limit check and inventory adjustment functions.

TABLE XXIV

| ReqCnt | 2 |
|---|---|
| FunctID | 378 |
| Status | True |
| Offset | 0 |
| Length | 175 |
| FunctID | 34 |
| Status | True |
| Offset | 175 |
| Length | 0 |

The ReqCnt field indicates the response control block refers to two functions. The FunctID fields identify the functions as the credit check function 378 and the general ledger entry function 34. The Status fields flag are set true to indicate that the functions were successfully carried out. (If server star 24(2) did not respond to server gate 26(2) within the allotted time, server gate 26(2) would have set both Status flags false to indicate the functions failed.) The first Offset and Length fields key into the response data block produced by server star 24(2) conveying the 175-bit customer's credit limit output data of the credit limit check function. The second Offset and Length fields refer to data of length zero since the general ledger entry function produces no output data.

Table XXV below illustrates the response control block server gate 26(3) sends to client gate 20 when server star 24(3) has completed the inventory check function.

TABLE XXV

| ReqCnt | 1 |
|---|---|
| FunctID | 130 |
| Status | True |
| Offset | 0 |
| Length | 0 |

The ReqCnt field indicates the response control block refers to one requested function. The FunctID field identifies the function as the inventory adjustment function 130. The Status field contains a flag set true to indicate that the function was successfully carried out. (If server star 24(3) did not respond to server gate 26(3) within the allotted time, server gate 26(3) would have set the Status flag to false to indicate the function failed.) The zero-valued Offset and Length fields indicate that server star 24(3) produced no output data for the inventory adjustment function.

RESPONSE DATA BLOCK

Table XXVI below illustrates the response data block assembled by client gate 20 from all response data blocks received from server gates 26(2) and 26(3). Client gate 20 passes this response data block to client star 16.

TABLE XXVI

| Bit Range | Data |
|---|---|
| 1–175 | Current inventory level |
| 176–350 | Customer credit limit |

Bits 1 to 174 of the response data block convey the current inventory level provided by server star 24(3). Bits 176–350 convey the customer credit limit provided by server star 24(2).

RESPONSE

Table XXVII below illustrates the structure of the response client gate 20 returns to client star 16 after all server gates 26 have returned their responses to client gate 20.

TABLE XXVII

| ReqCnt | 5 |
|---|---|
| FunctID | 122 |
| Status | True |
| Offset | 0 |
| Length | 0 |
| FunctID | 129 |
| Status | True |
| Offset | 0 |
| Length | 175 |
| FunctID | 378 |
| Status | True |
| Offset | 175 |
| Length | 175 |
| FunctID | 34 |
| Status | True |
| Offset | 350 |
| Length | 0 |
| FunctID | 130 |
| Status | True |
| Offset | 350 |
| Length | 0 |

The ReqCnt field indicates the response refers to five functions which are identified by the FunctID fields. The Status fields indicate which functions were successful and the Offset and Length fields indicate the position of the output data from each function within the response data block assembled by client gate 20. Should any server gate have returned a response control block with a Status field set false to indicate a failure to carry out a requested function, the client gate would have placed a false flag in the corresponding Status field of the response data structure.

Sever Star Programs

FIG. 4 is a flow chart illustrating operation of server star 24(1). When invoked, server star 24(1) reads the customer account number in the request data block (step 40) and then checks data file A to determine if the customer account number is valid (step 42). If the customer account number is valid (step 44), server star 24(1) generates a response data block and sends a return data structure to server gate 26(1) (step 46). If the. customer account number is not valid, server star program 24(1) terminates without returning to server gate 26(1).

FIG. 5 is a flow chart illustrating operation of server star 24(3). When invoked, server star 24(3) reads the inventory data in the request data block (step 50) and reads data file D to determine if a sufficient quantity of the ordered item is available (step 52). If a sufficient quantity is available (step 54), server star 24(3) generates a response data block and sends a return data structure to server gate 26(3) (step 56). The response data block contains 175 bits indicating the number of items on hand. If a sufficient quantity is not available, server star program 24(3) stops without returning to server gate 26(3).

Figure 6:
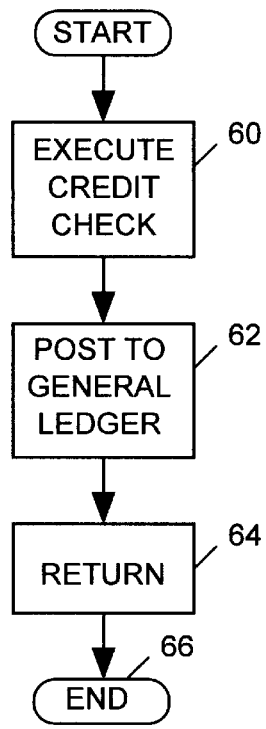

FIG. 6 is a flow chart illustrating a routine executed by server star 24(2) upon being invoked and receiving the call structure of Table XXV from server gate 26(2). Server star 24(2) first executes a subroutine which carries out the credit check, function (step 60), and then executes another subroutine which. carries out the general ledger entry function (step 62). Thereafter, server star 24(2) generates a response data block and returns to its calling server gate 26(3) (step 66).

Figure 7:
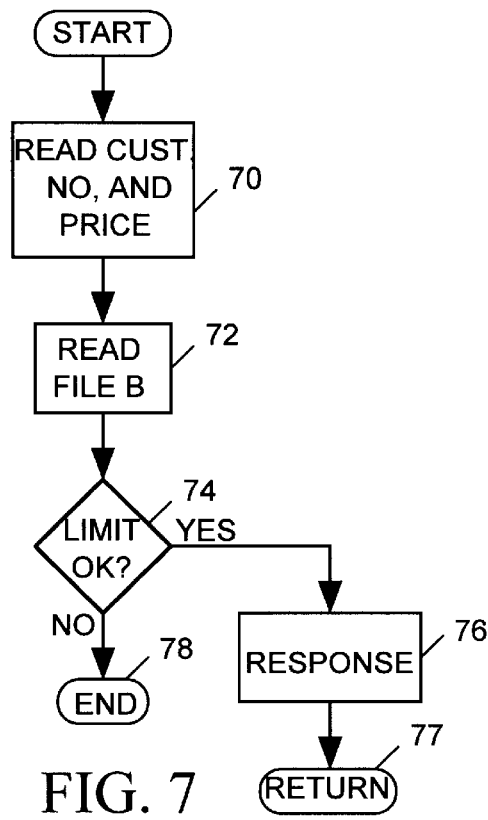

FIG. 7 is a flow chart illustrating the subroutine executed by server star 24(2) at step 60 of FIG. 6 when carrying out the credit check function. The subroutine first reads the customer number and purchase price included in the request data block (step 70) and then checks data file B (step 72). If the customer's credit limit is sufficient to cover the purchase (step 74), the subroutine returns a 70-bit response data block indicating the customer's credit limit (step 76). If the customer's credit limit is not sufficient, the subroutine ends server star 24(2) operation so that it does not send a response to server gate 26(2) (step 78).

Figure 8:
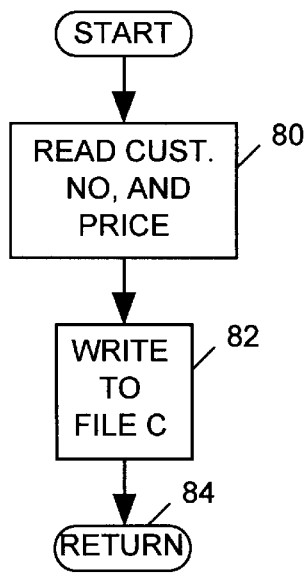

FIG. 8 is a flow chart illustrating the subroutine executed by server star 24(2) at step 62 of FIG. 6 when carrying out the general ledger entry function. The subroutine initially reads the customer number and purchase price included in the request data block (step 80) and then uses that data to write the ledger entry into data file C (step 82). Server star 24(2) then returns to the calling routine (step 74).

Figure 9:
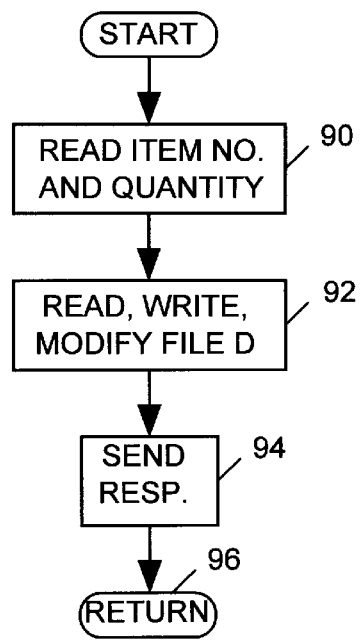

FIG. 9 is a flow chart illustrating operation of server star 24(3) in carrying out the inventory adjustment function. When invoked, server star 24(3) reads the inventory data in the request data block (step 90) and adjusts the inventory file D accordingly (step 92). It then generates a return data structure to server gate 26(3) (step 94).

Client Gate Program

Figure 10:
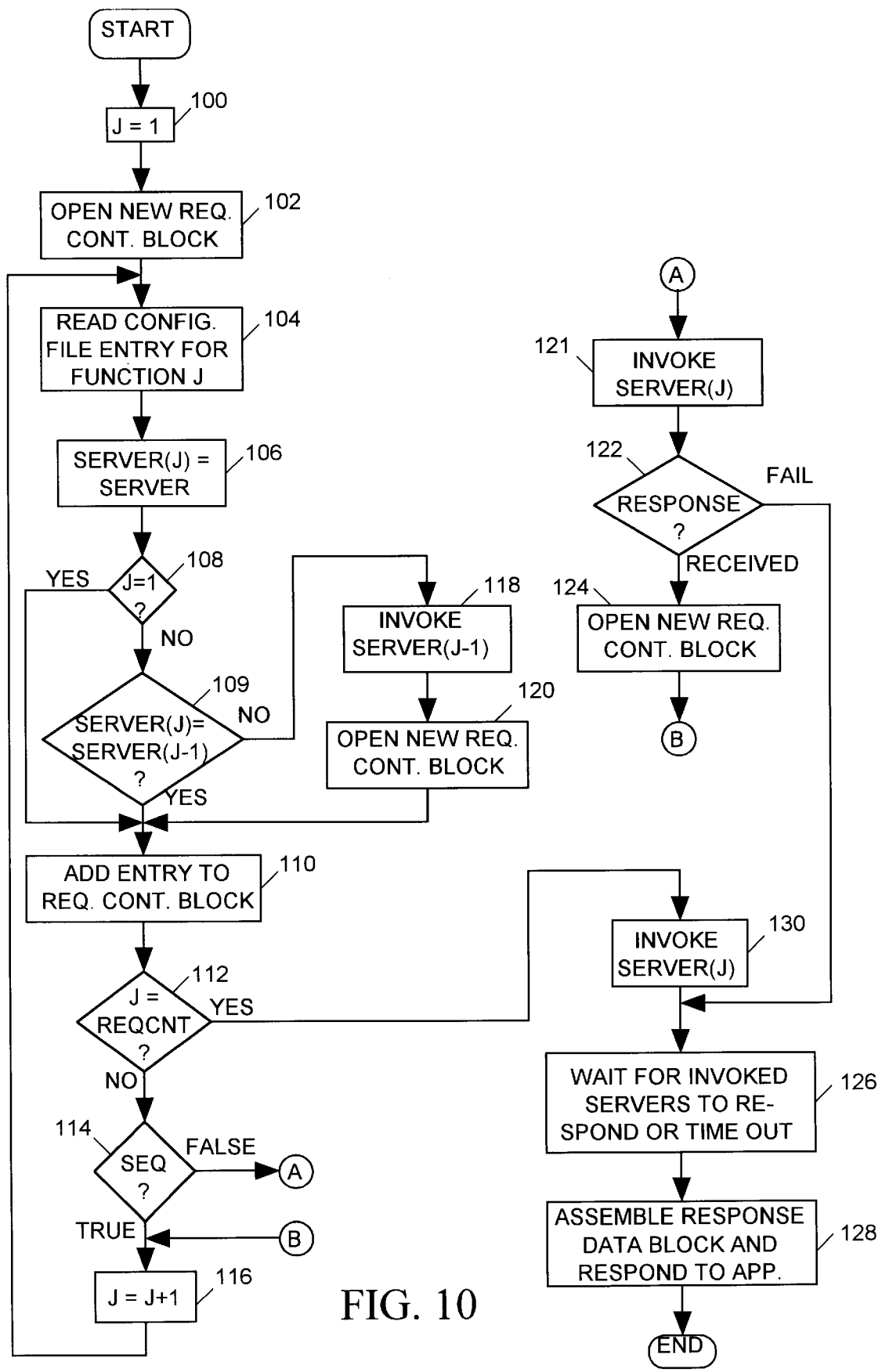
FIG. 10 is a flow chart illustrating operation of a client gate of FIG. 3.

FIG. 10 is a flow chart illustrating operation of client gate 20. The client gate program is application independent and operates in a similar manner for all client computers. As discussed above, a request (see Table I) from client star 16 asks the client gate to invoke one or more functions. The ReqCnt field of the request indicates the number of functions requested.

The client gate assigns a separate number J to each requested function and processes the requested functions in the order they are requested. The client gate initially sets a counter J equal to one (step 100) as it begins to process the request for function J=1, the first function listed in the request from the client star. The client gate also opens (begins to create) a new request control block data structure for the server gate that is to respond to the request for function J (step 102). The client gate then reads the configuration file entry for function J using the requested function's ID as the entry key (step 104). The client gate next sets an indexed variable SERVER(J) equal to the value of the Server field in the configuration file entry for function J (step 106). If J is 1 (step 108), the client gate adds an entry to the request control block for function J (step 110). It then determines whether J is equal to the ReqCnt field of the request, thereby indicating the last function of the request is being processed (step 112). If function J is not the last listed function, the client gate checks the Seq field of the configuration file entry for function J (step 114). If the Seq field is True, it is not necessary for function J to be successfully carried out before remaining functions of the request can be processed. In such case the client gate, without yet invoking function J, increments J (step 116) and returns to step 104 to read the configuration file entry for the next requested function.

When J is greater than 1 at step 108, the client gate determines whether the server for function J is the same as the server for the preceding function J-1 (step 109). If so, the client gate adds the entry for function J to the request data block under construction (step 110). However when the server for function J is not the same as the server for function J-1 (step 109), the client gate does not add an entry for function J to the request control data block it is currently building. Instead the client gate invokes the server gate identified by SERVER(J-1) by sending it the previously constructed control data block as well as the request data block generated by the application (step 118). That server gate, Server(J-1), then begins calling server stars to carry out the functions referenced by the request control block. After sending the request control block to the server gate, the client gate opens a new request control block (step 120) data structure and adds the entry for function J to the new request control block (step 110).

When the configuration file entry for function J has a Seq field set false, that function must be successfully executed before any remaining functions can be invoked. Thus at step 114, when the Seq field for function J is false, the client gate invokes the server identified by SERVER(J), passing it the request data block and the last constructed request control block (step 121). It thereafter awaits a response from the server gate (step 122). If the server gate returns a response control block indicating that the function was successful, the client gate starts a new request control block data structure (step 124) and returns to step 116. If at step 122 the server gate returns a control data block indicating that the function timed out, then the client gate waits until all previously invoked servers to respond (step 126). It then assembles a response data block from the response data blocks it has received from the invoked client gates and sends a response to the requesting client star (step 128). The client gate thereupon ends processing of the request without invoking remaining functions in the request.

If at step 112, the client gate determines that function J is the last function in the request, it invokes the server identified by Server(J) (step 130) and waits for all invoked servers to respond by returning response data blocks and response control blocks (step 126). The client gate then assembles a single response data block from the respond data blocks returned by all server gates, generates a response data structure and returns it to the client star (step 128). At this point the client gate program has completed processing the request.

Server Gate Program

Figure 11:
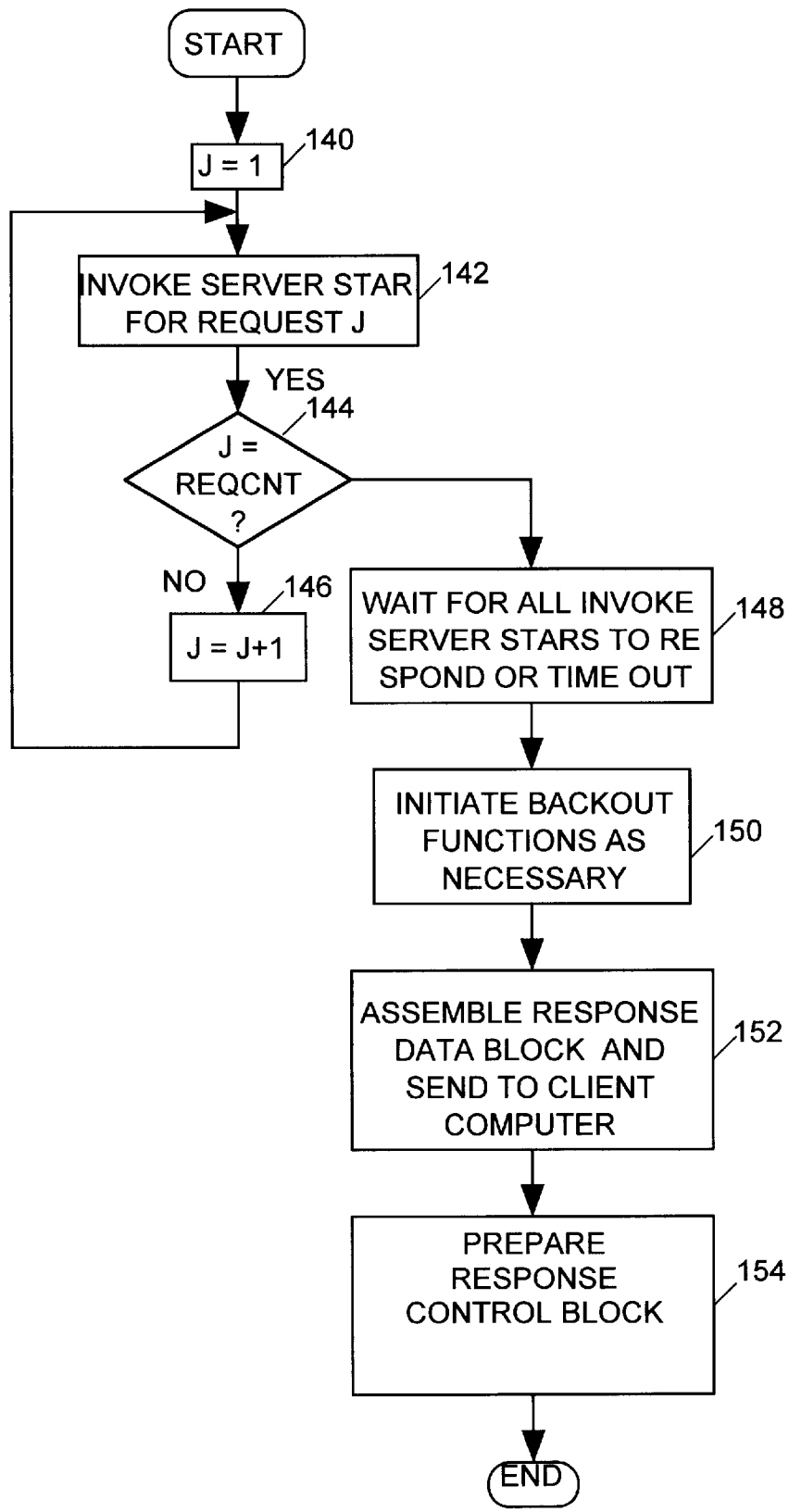
FIG. 11 is a flow chart illustrating operation of a server gate of FIG. 3.

FIG. 11 is a flow chart illustrating operation of a typical server gate 26. As described above, the server gate receives a request control data block listing one or more functions. The server gate assigns a separate number J to each requested function in the order listed. Setting a counter J equal to 1 (step 140) the server gate invokes the server star identified by the Datastar field of the request control block entry for the first listed request (step 142). If J is not equal to the ReqCnt field, indicating function J is not the last listed function of the request control block (step 144), the server gate increments J (step 146) and then returns to step 142 to process the next function. The server gate repeats steps 140–146 until at step 144 J equals the ReqCnt field, indicating that function J is the last function of the request control block. At that point, the server gate waits until all invoked server stars have responded or timed out (step 148). The server gate then invokes backout functions for any server stars that have timed out and for which the request control block has called for a backout function (step 150). The server gate then assembles response data blocks generated by the invoked server stars into a single response data block and forwards that response data block to the client computer (step 152). Finally, the server gate generates a response control block based on the responses of the server stars, and forwards the response control block to the requesting client gate (step 154).

Thus in accordance with the invention, client applications (client stars 16) may read or write access data files 18 but need not know where those files are located, what their names are, or how those files are formatted or accessed. Nor do client stars 16 need to concern themselves with particulars of the network environment or the platform on which the data files reside. Such matters are handled by the client and server gates, the configuration files, and the server stars. When the location, name, and/or structure of a data file changes, it is necessary to change only the server stars which access them and/or the configuration files referencing them. It is normally not necessary to alter the client stars that use the files. The present invention therefore simplifies the task of creating application programs for a distributed computing system by standardizing the manner in which remote data files are accessed and reducing or eliminating the need to change application programs when the location or structure of the data files they use change.

Additional Applications

While the forgoing specification has described preferred embodiment(s) of the present invention, one skilled in the art may make many modifications to the preferred embodiment without departing from the invention in its broader aspects. In particular, server stars may carry out functions other than read, write or read/modify/write accessing data files. For example, in a distributed data acquisition and control system, a server star may make a change to a control setting of an instrument controlled by a server computer executing the server star, may acquire data from a remote sensor queried by a server computer, or may generate a display controlled by a server computer. A server star may also act as a controller for a printer or other peripheral device. The claims therefore are intended to cover all such modifications and applications as fall within the true scope and spirit of the invention.

What is claimed is:

1. A distributed computing system comprising:

a client computer for executing a client program and a client gate program, a server computer for executing a server program and for executing a server gate program, and network means for providing a communication path between the client and server computer, wherein said client program when executed calls a particular function to be executed by said server program by generating an argument for the particular function and sending a first request to said client gate program, the first request identifying said particular function, wherein said client computer stores a configuration file containing an entry corresponding to said particular function and referencing said server program and said server computer, wherein upon receiving the first request, the client gate program ascertains the server program that is to carry out the particular function and ascertains the server computer that is to execute the server program by reading said entry in the configuration file corresponding to the particular function, passes the argument from the client program to said server computer via said network means and sends a second request referencing said server program and said particular function to the server gate program via said network means, wherein the server gate program, upon receiving the second request, invokes execution of the server program referenced thereby and tells the server program to carry out said particular function, and wherein the server program, when executed, acquires the argument passed to the server computer and carries out the particular function in response to said argument.

2. The distributed computing system in accordance with claim 1 wherein the server computer stores a data file, wherein said particular function comprises accessing said data file in a manner indicated by said argument passed to the one server computer.

3. The distributed computing system in accordance with claim 1 wherein said particular function has associated therewith a unique function identification code (ID) and wherein said first request identifies said particular function by its ID.

4. The distributed computing system in accordance with claim 3 wherein the server program selectively executes any one of a plurality of functions when invoked including said particular function, wherein the second request includes said ID of said particular function, wherein the server gate program passes the ID of said particular function to said server program when it invokes execution of said server program, and wherein the server program selects which one of said plurality of functions to execute in response to the ID passed by said server gate program.

5. The distributed computing system in accordance with claim 1 wherein the server program, when executed, attempts to carry out said particular function and thereafter returns a first response to said one server gate program indicting whether it has successfully carried out said particular function.

6. The distributed computing system in accordance with claim 5 wherein said server gate program, after receiving said first response, returns a second response to said client gate program, the second response indicating whether said particular function was successfully carried out.

7. The distributed computing system in accordance with claim 6 wherein said client gate program, after receiving said second response, returns a third response to said client program indicating whether said particular function was successfully carried out.

8. The distributed computing system in accordance with claim 1 wherein said configuration file contains a TimeOut field indicating a time, wherein the client gate program includes the TimeOut field in the second request sent to the server gate program, wherein upon successfully carrying out said particular function, said server program returns a first response to said server gate program indicating said particular function has been successfully carried out, and wherein after invoking execution of said server program, said server gate program returns a second response to said client gate program, the second response indicating whether said server program has returned said first response within the time indicated by said TimeOut field.

9. The distributed computing system in accordance with claim 8 wherein said entry of the configuration file contains a Backout field indicating whether the server program referenced by the entry is to execute a backout function, wherein the client gate program includes the Backout field in the second request sent to the server gate program, wherein when the server program returns said first response after the time indicated by the TimeOut field, the server gate program again invokes the server program, wherein the server program when again invoked, executes said backout function.

10. The distributed computing system in accordance with claim 9 wherein said backout function reversers an operation carried out by said particular function.

11. A distributed computing system comprising:

a client computer for executing a client program and for executing a client gate program, a plurality of server computers, each executing at least one server program and each for executing a separate server gate program, wherein each server program carries out at least one function in response to an input argument; and network means for providing a communication path between the client and server computers, wherein the client program invokes execution of a plurality of functions by generating arguments for the functions and by sending a first request to the client gate program, the first request containing a list of said functions to be invoked, wherein, upon receiving the first request, the client gate program ascertains a plurality of server programs that are to carry out the functions, passes the arguments generated by the client program via said network means to particular server computers that are to execute the ascertained server programs, and sends a separate second request to a server gate program executed by each particular server computer via said network means, the second request referencing server programs to be invoked, wherein each server gate program, upon receiving a said second request, invokes execution of each server program identified thereby, and wherein each server program, when executed, carries out its function in accordance with an argument passed to its server computer.

12. The distributed computing system in accordance with claim 11 wherein each function has associated therewith a unique function identification code (ID), wherein said first request identifies said each function by its ID.

13. The distributed computing system in accordance with claim 12 wherein the client computer stores a configuration file, wherein the configuration file contains an entry corresponding to each function ID, wherein each entry of the configuration file references the particular server program that is to carry out the corresponding function and references a particular server computer that executes the particular server program, and wherein the client gate program ascertains which server program is to carry out each function and ascertains which server computer executes that server program by reading the entry in the configuration file corresponding to the function's ID.

14. The distributed computing system in accordance with claim 13 wherein the configuration file contains a TimeOut field indicating a time, wherein the client gate program includes the TimeOut field in each second request sent to the server gate programs, wherein upon successfully carrying out its function, each server program returns a first response to its server gate program indicating its function has been successfully carried out, and wherein after invoking a server program, each server gate program returns a separate second response to said client gate program, the second response indicating whether the invoked server program has returned its first response within a time indicated by said TimeOut field.

15. The distributed computing system in accordance with claim 14 wherein each entry of the configuration file contains a Seq field indicating whether the server program referenced by the entry must successfully carry out its function within the time indicated in the TimeOut field of said entry before other server programs carrying out other functions listed in said first request may be invoked, and wherein when the Seq field of a configuration file entry for a function included on said list indicates that the server program referenced by the entry must successfully carry out its function within the time indicated in the TimeOut field of said entry before server programs carrying other functions listed in said first request may be invoked, the client gate program refrains from sending a second request to server gate programs that are to invoke said other server programs until it receives a second response from a server gate program indicating that the server program referenced by the entry has successfully carried out its function within the time indicated in the TimeOut field of said entry.

16. The distributed computing system in accordance with claim 13 wherein upon successfully carrying out its function, each server program returns a first response to its server gate program indicating its function has been successfully carried out, wherein upon receiving said first response, each server gate program returns a second response to said client gate program indicating the invoked sever program has successfully carried out its function, wherein the configuration file contains a Sync field indicating whether the client gate is to respond synchronously or asynchronously to the client program, wherein when the Sync field indicates that the client gate is to respond synchronously, the client gate waits until it has received a second response from each server gate invoking a server program carrying out a function listed in said first request and then sends a third response to said client program indicating that all functions listed in said first request have been successfully carried out, and wherein when the Sync field indicates that the client gate is to respond asynchronously, the client gate sends a third response to the client program immediately upon receiving a second response from any server gate having invoked a server program carrying out a function listed in said first request, the third response indicating that the function listed in said first request has been successfully carried out.

17. A distributed computing system comprising:

a client computer for executing a client program, for executing a client gate program, and for storing a configuration file;

a plurality of server computers, each for executing at least one server program and each for executing a separate server gate program; and network means providing a communication path between the client and server computers, wherein each server program carries out at least one function in a manner indicated by an input argument, wherein each function has a unique identification code (ID), wherein the client program invokes execution of a plurality of functions by generating an argument for each of said plurality of functions and sending a first request to the client gate program, the first request containing an ID of each of said plurality of functions, wherein the configuration file includes a TimeOut field indicating a time allowed for executing each function and includes an entry corresponding to each of said function IDs, each entry of the configuration file containing a DataStar field indicating which server program is to carry out the function referenced by the entry's corresponding ID, a Server field indicating which server computer is to invoke the server program, and a Seq field indicating whether the function is to be successfully executed within the time indicated by the TimeOut field before other functions referenced by said list may be executed, wherein, upon receiving the first request, the client gate program successively consults the configuration file entry for each successive ID on the list passes an argument generated by the client program to the server computer referenced by the Server field, and sends a second request containing the TimeOut and Datastar fields to the server gate program executed by the server computer referenced by the Server field, wherein each server gate program, upon receiving said second request, invokes the server program identified by the Datastar field thereof, and wherein each invoked server program acquires an argument passed to its server computer, executes its function in response thereto and then returns a first response to its invoking server gate program indicating whether it has successfully carried out its function.

18. The distributed computing system in accordance with claim 17 wherein each server gate program sends a second response to the client gate program, the second response indicating whether the server program invoked by the server gate program returned its first response within the time allowed by the TimeOut field included in the second request sent to the server gate program.

19. The distributed computing system in accordance with claim 18 wherein after sending a second request to a server gate program identified by the Server field of a configuration file entry containing a Seq field indicating that the function identified by the ID corresponding to the entry is to be carried out within the time indicated by the TimeOut field as a precondition to execution of a function whose ID is next listed in said first request, the client gate program waits until it receives a second response indicating that the function has been carried out before sending a second request in response to the next ID listed in the first request, and wherein after sending a second request to a server gate program identified by the Server field of a configuration file entry containing a Seq field indicating that the function identified by the ID corresponding to the entry need not be carried out within the time indicated by the TimeOut field as a precondition to execution of a function whose ID is next listed in said first request, the client gate program sends a second request in response to the next ID listed in the first request without waiting until it receives a second response indicating that the function has been carried out.

\* \* \* \* \*